(12) United States Patent
Miyazoe

(10) Patent No.: US 6,167,762 B1
(45) Date of Patent: Jan. 2, 2001

(54) RAIL-MOUNTED FLUID-PRESSURE INDICATING APPARATUS

(75) Inventor: Shinji Miyazoe, Ibaraki (JP)

(73) Assignee: SMC Corporation, Tokyo (JP)

( * ) Notice: Under 35 U.S.C. 154(b), the term of this patent shall be extended for 0 days.

(21) Appl. No.: 09/221,126

(22) Filed: Dec. 28, 1998

(30) Foreign Application Priority Data

Jan. 6, 1998 (JP) .................................................. 10-012121

(51) Int. Cl.[7] .................................................. G01L 7/00
(52) U.S. Cl. .................................................. 73/756
(58) Field of Search .................. 73/756, 146, 865.8, 73/121, 714; 137/271, 343, 884; 251/367; 188/206 R; 105/77

(56) References Cited

U.S. PATENT DOCUMENTS

| | | |
|---|---|---|
| 3,824,553 | 7/1974 | Glover et al. . |
| 3,927,739 * | 12/1975 | Katzer .............................. 188/206 R |
| 5,529,088 * | 6/1996 | Asou .................................... 137/343 |

FOREIGN PATENT DOCUMENTS

| | | |
|---|---|---|
| 0 703 391 | 3/1996 | (EP) . |
| 8-2536 | 1/1996 | (JP) . |

* cited by examiner

*Primary Examiner*—William Oen
(74) *Attorney, Agent, or Firm*—Oblon, Spivak, McClelland, Maier & Neustadt, P.C.

(57) ABSTRACT

The present invention provides a fluid-pressure indicating apparatus including a mounting mechanism with a lock mechanism which can be simply removed from a rail when used alone but which cannot be removed from the rail when coupled to adjacent apparatuses. To achieve this, an elastic piece 18, which defines the depth of one 17a of two recessed portions 17a and 17b formed in the groove walls of a rail mounting groove, is provided on the side of the first recessed portion 17a in such a way as to be elastically shifted, and a stopper 19, which engages the elastic piece of the adjacent fluid-pressure indicating apparatus so as to regulate its shifting when the apparatus is coupled to this adjacent fluid-pressure indicating apparatus, is also provided on the side of the first recessed portion.

6 Claims, 4 Drawing Sheets

A

B

RAIL-MOUNTED FLUID-PRESSURE INDICATING APPARATUS

FIELD OF THE INVENTION

The present invention relates to a fluid-pressure indicating apparatus that is mounted on a rail, and in particular, to a fluid-pressure indicating apparatus including a mounting mechanism with a lock function for preventing the apparatus from slipping out from the rail when it does not need to be removed therefrom.

PRIOR ART

There are well-known techniques for mounting a plurality of control valves on a rail directly or via manifolds in order to control these valves collectively.

For example, Japanese Patent Publication NO. 8-2536 discloses a mounting mechanism conventionally used to mount fluid-pressure indicating apparatuses, such as directional control valves or manifolds, onto a rail. In this mounting mechanism, a mounting groove 4 in which a rail 3 is fitted is provided at the bottom surface of the body 2 of a directional control valve 1. On one side of the walls of the mounting groove 4, a recessed portion 5 is formed in which one (3a) of the flanges of the rail 3 is fitted and locked, and an elastic locking piece 6 including a jaw portion 6a with which the other flange 3b is engaged is provided on the other side wall, as shown in FIG. 7.

The directional control valve 1, mentioned above, is mounted on the rail 3 by fitting one (3a) of the flanges of the rail 3 in the recessed portion 5, and then pressing the rail 3 into the mounting groove 4 while allowing the other flange 3b to elastically deform the elastic locking piece 6, thereby engaging the flange 3b with the jaw portion 6a of the elastic locking piece 6. Conversely, the directional control valve 1 is removed from the rail 3 by elastically deforming the elastic locking piece 6 to remove one (3b) of the flanges from the jaw portion 6a, and then pulling the other flange 3a out from the recessed portion 5.

Such a mounting mechanism has the advantage of enabling the directional control valve 1 to be mounted on the rail 3 at an arbitrary position and to be removed therefrom; the mechanism even enables a directional control valve located in the middle of a plurality of directional control valves to be simply detached therefrom.

This mechanism has no problems under normal operating conditions, but if an unexpected force is applied to the directional control valve via a pipe connected to the valve in such a way that the valve is pulled off from the rail, the valve may slip out from the rail. Thus, when the directional control valve does not need to be removed from the rail, it must be prevented from slipping out accidentally.

DISCLOSURE OF THE INVENTION

It is a technical object of this invention to provide a fluid-pressure indicating apparatus including a mounting mechanism with a lock mechanism which can be simply removed from a rail when used alone but which cannot be removed from the rail when coupled to adjacent apparatuses.

To achieve this object, a fluid-pressure indicating apparatus according to this invention is characterized in that a first and a second recessed portions in which locking flanges on the respective sides of a rail are fitted and engaged are formed in the opposed groove walls of a rail mounting groove. An elastic piece that defines the depth of the first recessed portion is provided on the first recessed portion side in such a way as to be elastically shifted. A stopper that engages the elastic piece of the adjacent fluid-pressure indicating apparatus to regulate its shifting when the apparatus is coupled to this adjacent fluid-pressure indicating apparatus is also provided on the first recessed portion side.

The fluid-pressure indicating apparatus of this configuration is mounted on the rail by fitting one of the flanges of the rail in the first recessed portion 1 of the mounting groove, allowing the flange to press the elastic piece so that the rail moves toward the first recessed portion, fitting the rail in the mounting groove, and then moving it in the horizontal direction toward the second recessed portion so that the other flange is engaged in the second recessed portion. On the other hand, the fluid-pressure indicating apparatus can be removed from the rail by performing the same operations in the reverse order.

When a number of fluid-pressure indicating apparatuses are mounted on the rail and adjacent apparatuses are coupled together, the stopper of one fluid-pressure indicating apparatus engages and locks with the elastic piece of the adjacent apparatus to regulate its shifting. In this way, the lock function acts on the adjacent fluid-pressure indicating apparatus to prevent it from being removed from the rail. This prevents the fluid-pressure indicating apparatus from slipping out from the rail even if a large external force is applied to the apparatus via a pipe.

According to a specific configuration, the elastic piece is mounted in a hollow space formed on one of the sides of the fluid-pressure indicating apparatus, and the stopper is provided on the other side in such away as to protrude outward.

According to a preferred embodiment, the elastic piece extends from a place for mounting and fixing a stopper so as to be elastically deformed, and a space into which the stopper is inserted is formed behind the elastic piece.

According to one embodiment of this invention, the mounting groove, two recessed portions, and a stopper are directly formed in the body of the fluid-pressure indicating apparatus.

According to another embodiment of this invention, a rail fixture that is separate from the body of the fluid-pressure indicating apparatus is mounted on the body, and the mounting groove, two recessed portions, and stopper are provided in the fixture. In this case, at least one of the elastic piece and stopper can be integrated with the rail fixture.

DETAILED DESCRIPTION

Figure 1:
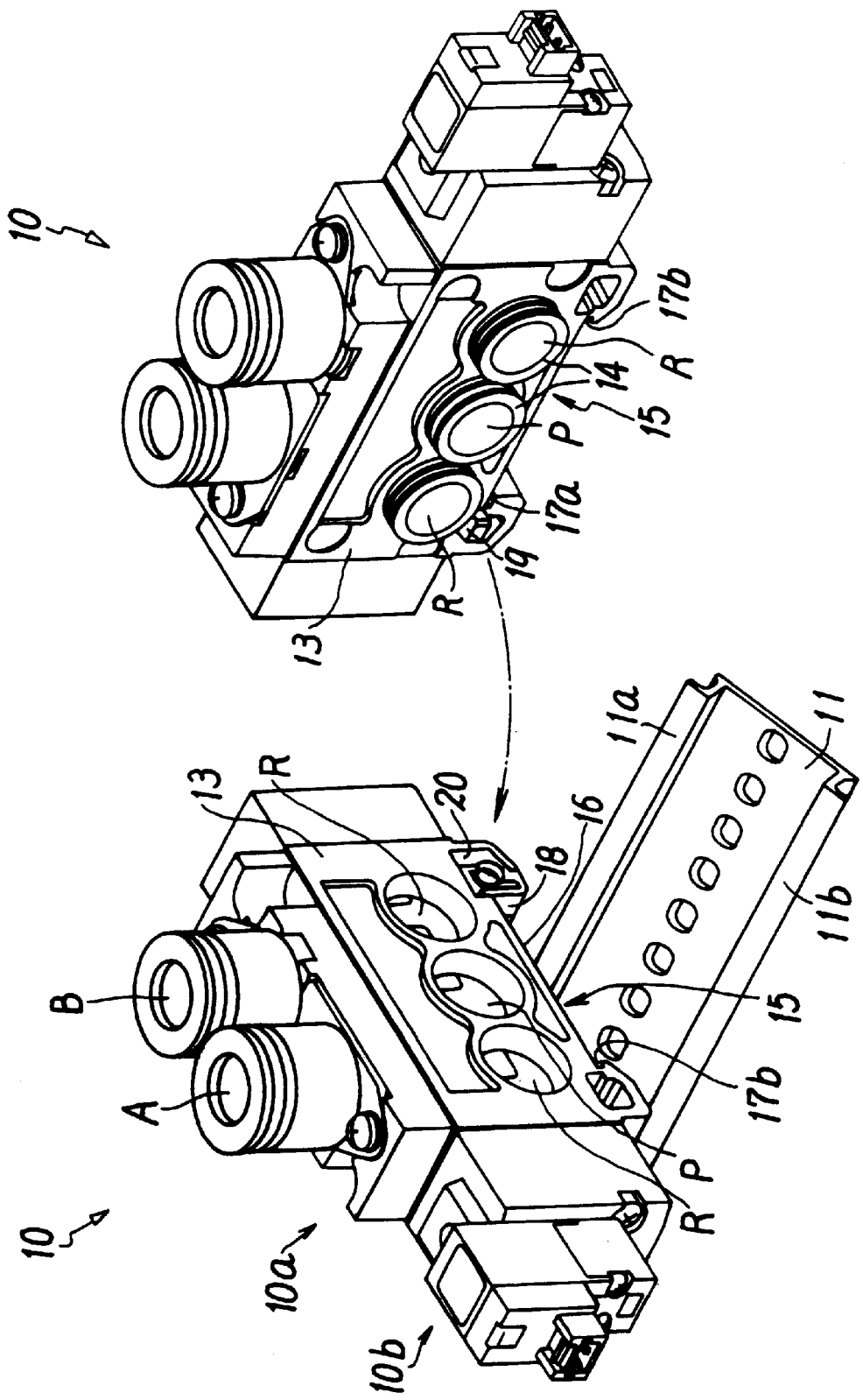
FIG. 1 is a perspective view showing a first embodiment of a fluid-pressure indicating apparatus according to this invention.

FIGS. 1 to 5 show a first embodiment of this invention. In FIG. 1, 10 is a directional control valve (in other words, a kind of fluid-pressure indicating apparatus), and 11 is a rail on which a number of directional control valves 10 are mounted together.

The rail 11 has a groove-shaped cross section, and has locking flanges 11a and 11b formed at the respective upper ends of its opposite groove walls and extending outward.

The directional control valve 10 is a solenoid pilot-operated directional control valve comprising a main valve section 10a for switching the direction of the flow of a working fluid such as compressed air and a solenoid-operated pilot valve section 10a for driving the main valve section 10a.

The body 13 of the main valve section 10a is rectangular and has one supply through-hole P and two ejection through-holes R, R so that the working fluid is supplied and ejected from the valve mechanism through these through-holes and so that the fluid is then output through two output ports A and B formed in the top surface of the body 13. When a number of directional control valves 10 are mounted on the rail 11 and coupled together, the through-holes P and R, R in the directional control valve 10 communicate with the through-holes P and R, R in the adjacent directional control valve 10 via a short pipe 14, and the working fluid is concurrently supplied to and ejected from the directional control valves 10 through a supply and ejection block (not shown), which includes a supply port and an ejection port.

A mounting mechanism 15 for mounting the directional control valve on the rail 11 is formed on the bottom surface of the body 13. The mounting mechanism 15 has a mounting groove 16 in which the rail 11 is fitted, and a first and a second recessed portions 17a, 17b in which the flanges 11a, 11b of the rail 11 are fitted and locked are formed in the laterally opposed groove walls of the mounting groove 16. An elastic piece 18 that defines the depth of the first recessed portion 17a is provided on the body portion on the side of the first recessed portion 17a so as to be elastically shifted when abutted on by the flange 11a. A stopper 19 is also provided on the body portion on the side of the first recessed portion so that when the directional control valve is joined with the adjacent directional control valve, it engages the elastic piece 18 of the adjacent valve to regulate its shifting.

Figure 2:
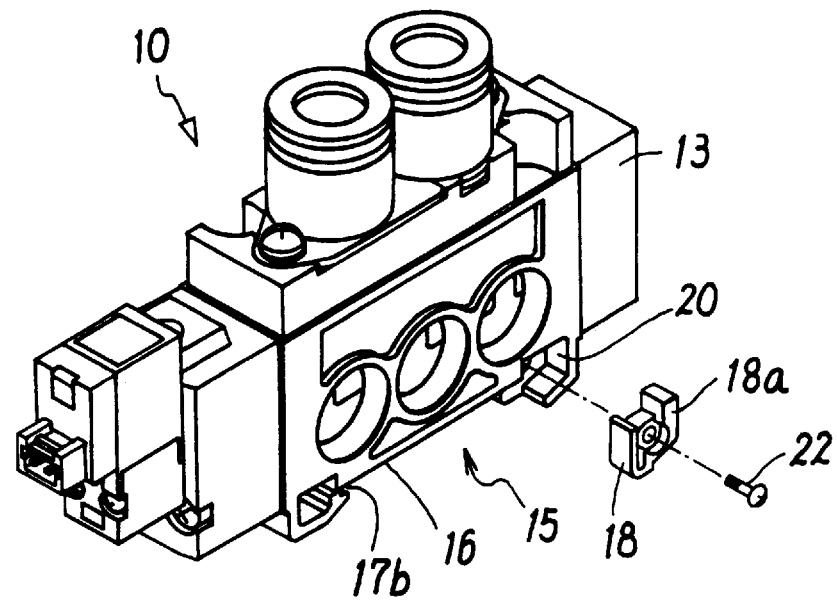
FIG. 2 is a perspective view showing several members disassembled from the fluid-pressure indicating apparatus in FIG. 1.
Figure 3:
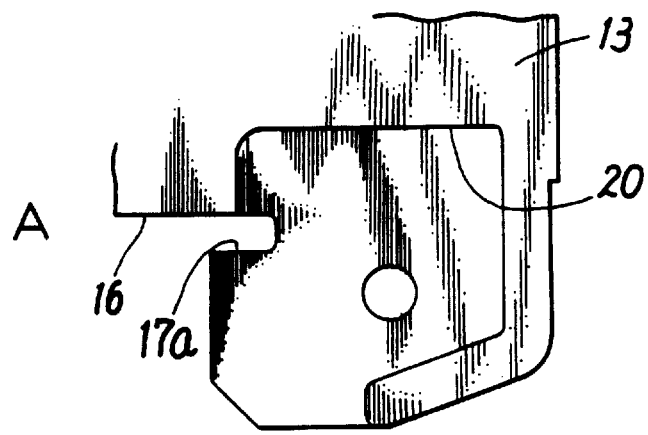
FIG. 3A is an enlarged view of the part of the fluid-pressure indicating apparatus and FIG. 3B is an enlarged front view of an elastic piece.
Figure 3:
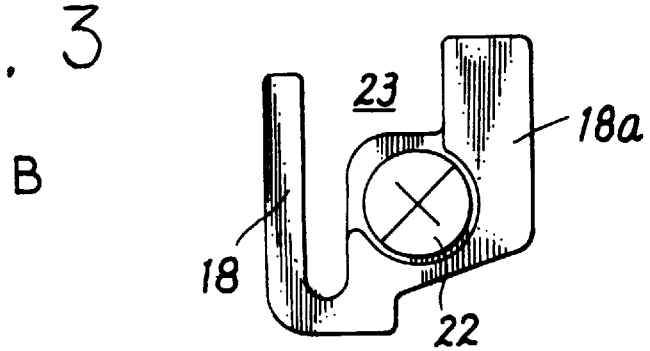

As seen in FIGS. 2, 3A, and 3B, the elastic piece 18 is mounted in a hollow space 20 formed in one (a joint surface) of the sides of the body 13.

The hollow space 20 is shaped like a rectangle and formed so that its inner end, which extends to the mounting groove 16, overlaps the first recessed portion 17a, and this inner end is open and is in communication with the mounting groove 16.

The elastic piece 18 has a mounting portion 18a that is fixed in the hollow space 20 using a screw 22 or another appropriate means. The elastic piece 18 extends from one end of the mounting portion 18a so as to be elastically formed, and is located on the side of the inner end of the hollow space 20 across the first recessed portion 17a. A space 23 into which a stopper 19 is inserted is formed behind the elastic piece 18. The elastic piece 18 is formed of an elastic material such as synthetic resin, rubber, or metal.

The means for fixing the mounting portion 18a in the hollow space 20b includes not only the screw 22 but also adhesion, press-fitting, and locking.

In addition, the stopper 19 is formed on the side of the body that is opposite to the side on which the elastic portion peace 18 is provided and at a position corresponding to the insertion space 23. The stopper is formed in such a way as to protrude outward. The stopper 19 may be integrated with the body 13 or may have another part mounted thereon.

Figure 4:
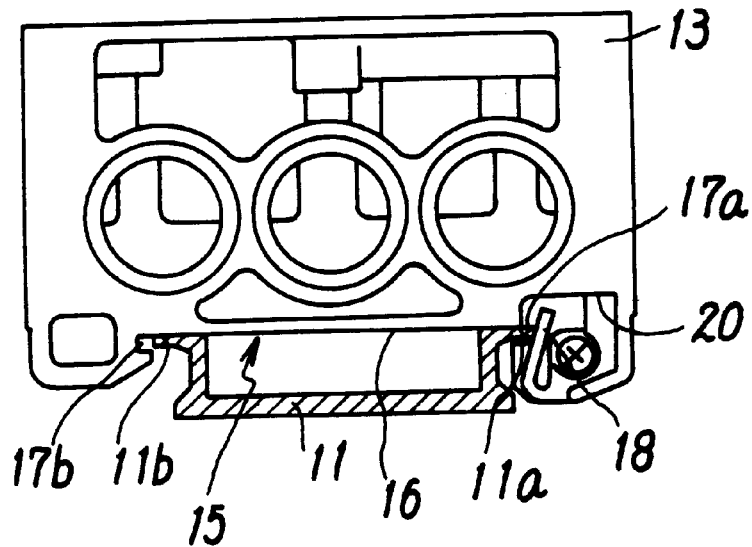
FIG. 4 is a side view of the fluid-pressure indicating apparatus before it is completely mounted on a rail.
Figure 5:
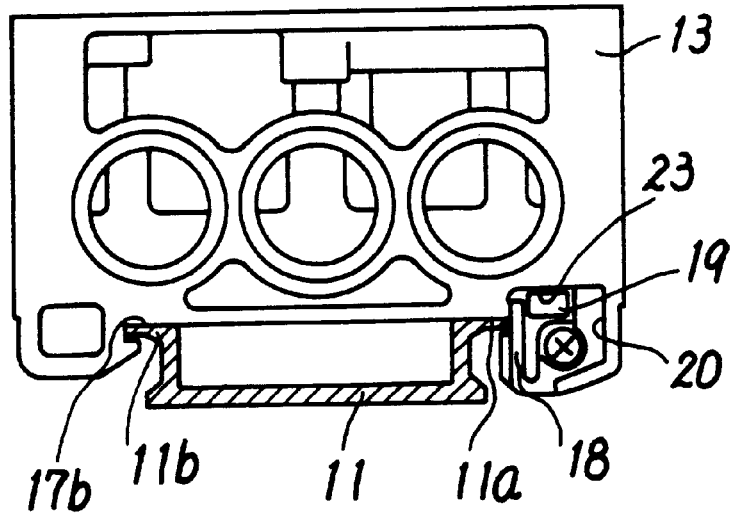
FIG. 5 is a side view of the fluid-pressure indicating apparatus after it is mounted on the rail.

The directional control valve 10 of this configuration is mounted on the rail 11 by fitting the first flange 11a of the rail 11 in the first recessed portion 17a of the mounting groove 16, allowing the first flange 11a to press and shift the elastic piece 18 so that the rail 11 moves toward the first recessed portion 17a, and fitting the rail 11 in the mounting groove 16, as shown in FIG. 4. Then, when the rail 11 is moved horizontally toward the second recessed portion 17b to allow the second flange 11b to be fitted in the second recessed portion 17b, the elastic piece 18 returns to allow the flanges 11a and 11b to keep the rail 11 fitted in the recessed portions 17a and 17b, thereby allowing the directional control valve 10 to be mounted on the rail 10.

The directional control valve 10 may be removed from the rail 11 by performing the same operations in the reverse order.

When a plurality of directional control valves are mounted on the rail 11 and adjacent apparatuses are coupled together, the stopper of one directional control valve 10 is fitted in the insertion space 23 and locked behind the elastic piece 18 of the adjacent valve to regulate its shifting, thereby preventing the rail 11 from being moved to the first recessed portion 17a side. Consequently, the directional control valve 10 cannot be removed from the rail 11. This configuration prevents the directional control 10 valve from slipping out from the rail 11 even if a large external force is applied to the valve 10 via the pipe connected to the output port.

To remove one of the assembled directional control valves 10 from the rail 11, that directional control valve may be disconnected from the adjacent valves and the elastic piece 18 may be released from the stopper 19.

Figure 6:
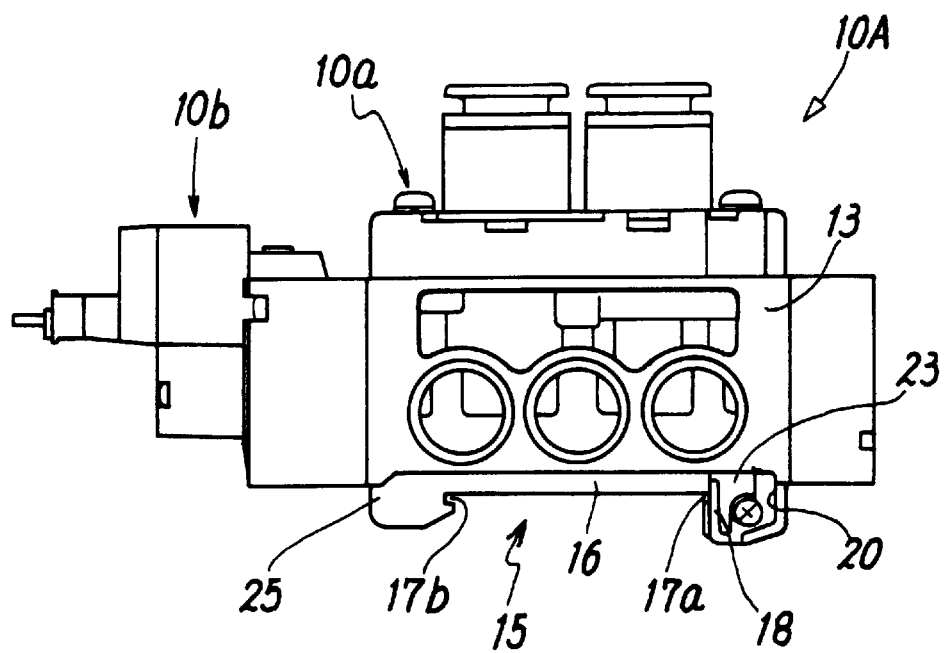
FIG. 6 is a perspective view showing a second embodiment of a fluid-pressure indicating apparatus according to this invention.
Figure 7:
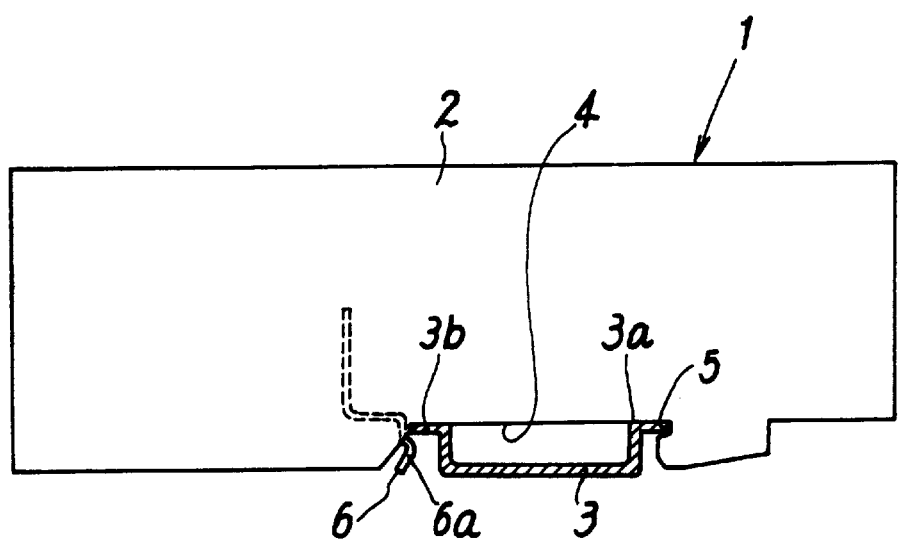
FIG. 7 is a side view showing how a conventional fluid-pressure indicating apparatus is mounted.

FIG. 6 shows a second embodiment of this invention. In a directional control valve 10A according to the second invention, a mounting mechanism 15 is formed by providing on the bottom surface of the body 13 a rail fixture 25 formed separately from the body 13. In the fixture 25, the mounting groove, two recessed portions 17a and 17b, elastic piece 18, and a stopper 19 are provided.

The fixture 25 is formed of a material such as synthetic resin or metal having a sufficient strength for such a fixture, and is mounted on the body using an appropriate means such as a screw. The form in which the mounting mechanism 15 is installed on the fixture 25 is substantially the same as the form in which the mounting mechanism is directly installed on the body 13 of the directional control valve 10.

If the fixture 25 is formed of a synthetic resin, either the elastic piece 18 or the stopper 19 should be integrated with it.

Although the above embodiments show the directional control valve as an example of a fluid-pressure indicating apparatus, this invention is of course applicable to other fluid-pressure indicating apparatuses such as manifolds.

As described above, according to this invention, when a single fluid-pressure indicating apparatus is removed from the rail for maintenance or the like, the lock function is canceled to allow this apparatus to be removed easily, whereas if adjacent fluid-pressure indicating apparatuses are coupled together, the lock function is automatically activated to prevent the apparatuses from being removed from the rail. This configuration prevents the fluid-pressure indicating apparatus from slipping out from the rail even if a large external force is applied to the apparatus via a pipe. As a result, this apparatus can be used over a wide pressure range, and can be handled safely and easily during pipe-laying work.

What is claimed is:

1. A fluid-pressure indicating apparatus that is mounted on a rail including on the respective axial sides, locking flanges extending outward, wherein:

the apparatus has a mounting groove in which said rail is fitted, wherein a first and a second recessed portions in which locking flanges of a rail are fitted and locked are formed on the opposed groove walls of the mounting groove, wherein an elastic piece that defines the depth of said first recessed portion is provided on the first recessed portion side in such a way as to be elastically shifted when abutted on by said flange, and wherein a stopper that engages the elastic piece of the adjacent fluid-pressure indicating apparatus to regulate its shifting when the apparatus is joined with this adjacent fluid-pressure indicating apparatus is also provided on the first recessed portion side.

2. A fluid-pressure indicating apparatus according to claim 1 wherein a hollow space is formed in one of the sides of the fluid-pressure indicating apparatus, said elastic piece being mounted in the hollow space, and said stopper being provided on the other side in such a way as to protrude outward.

3. A fluid-pressure indicating apparatus according to claim 1 wherein said elastic piece has a mounting portion that is mounted in said hollow space, wherein said elastic piece extends from the mounting portion so as to be elastically deformed and is located across said first recessed portion, and wherein a space into which said stopper is inserted is formed behind the elastic piece.

4. A fluid-pressure indicating apparatus according to any of claims 1 to 3 wherein said mounting groove, two recessed portions, and stopper are directly formed in the body of the fluid-pressure indicating apparatus, with said separately configured elastic portion assembled with these components.

5. A fluid-pressure indicating apparatus according to any of claims 1 to 3 wherein a rail fixture that is separate from the body of the fluid-pressure indicating apparatus is mounted on the body, and wherein said mounting groove, two recessed portions, elastic piece, and stopper are provided in the fixture.

6. A fluid-pressure indicating apparatus according to claim 5 wherein either said elastic piece or stopper is integrated with the rail fixture.

* * * * *